April 25, 1950　　　K. HENRICHSEN　　　2,505,183
ARTICULATED VEHICLE
Filed June 3, 1944　　　　　　　　　　　10 Sheets-Sheet 1
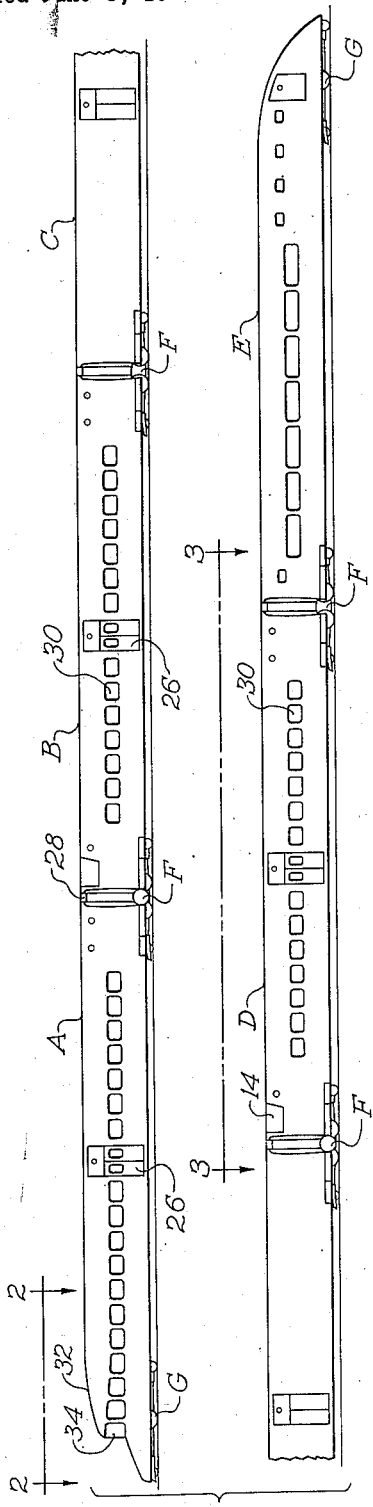
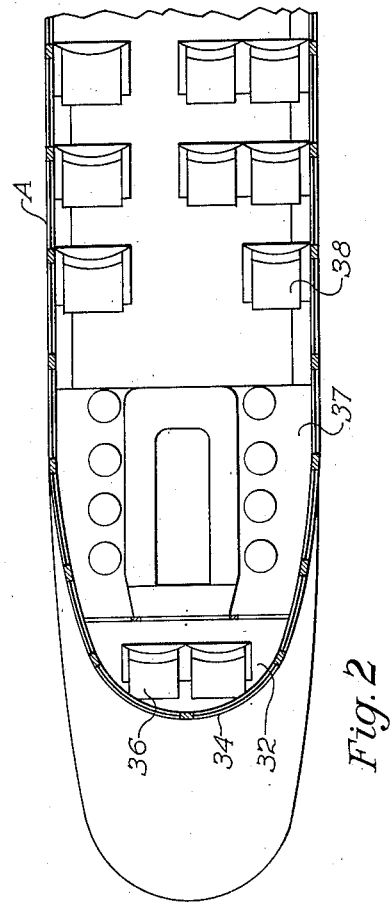
Fig.1
Fig.2
INVENTOR.
Knut Henrichsen
BY
Attorney April 25, 1950  K. HENRICHSEN  2,505,183
ARTICULATED VEHICLE
Filed June 3, 1944  10 Sheets-Sheet 2

INVENTOR.
Knut Henrichsen
BY
Attorney

April 25, 1950     K. HENRICHSEN     2,505,183
ARTICULATED VEHICLE

Filed June 3, 1944     10 Sheets-Sheet 3

INVENTOR.
Knut Henrichsen
BY
Attorney

INVENTOR.
Knut Henrichsen
BY
Attorney

April 25, 1950  K. HENRICHSEN  2,505,183
ARTICULATED VEHICLE
Filed June 3, 1944  10 Sheets-Sheet 5

INVENTOR.
Knut Henrichsen
BY
Attorney

April 25, 1950  K. HENRICHSEN  2,505,183
ARTICULATED VEHICLE
Filed June 3, 1944  10 Sheets-Sheet 6

INVENTOR
Knut Henrichsen
BY
Attorney

April 25, 1950     K. HENRICHSEN     2,505,183
ARTICULATED VEHICLE
Filed June 3, 1944     10 Sheets-Sheet 7
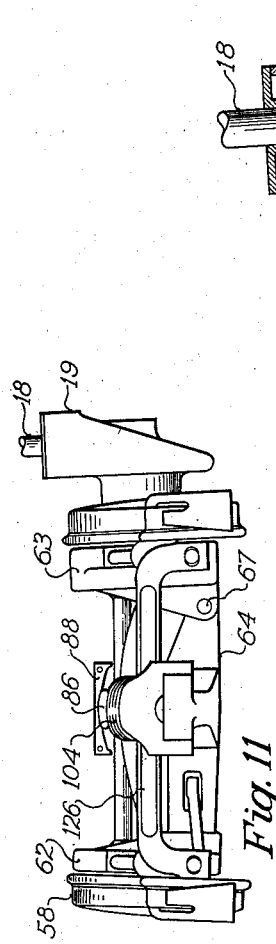
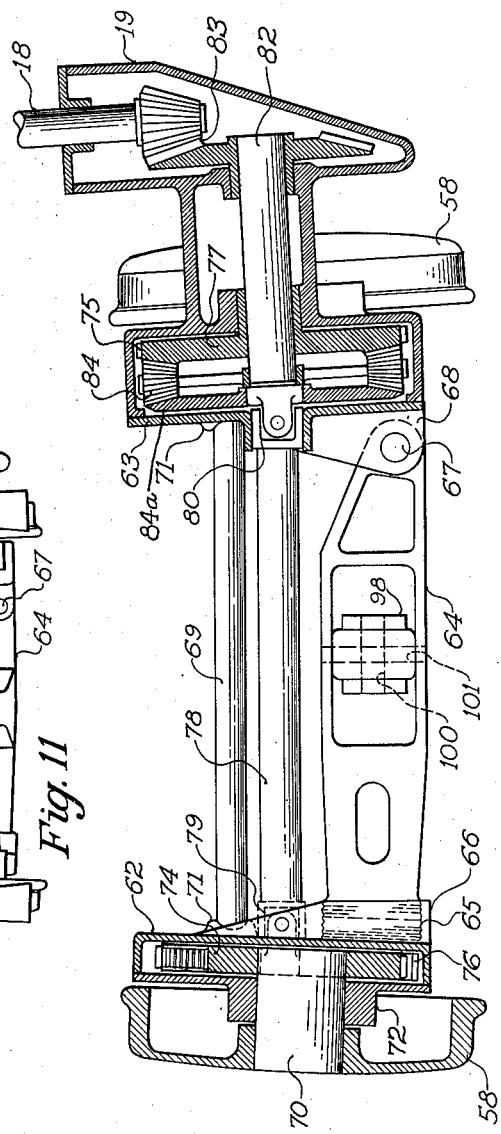
INVENTOR.
Knut Henrichsen
BY
Attorney

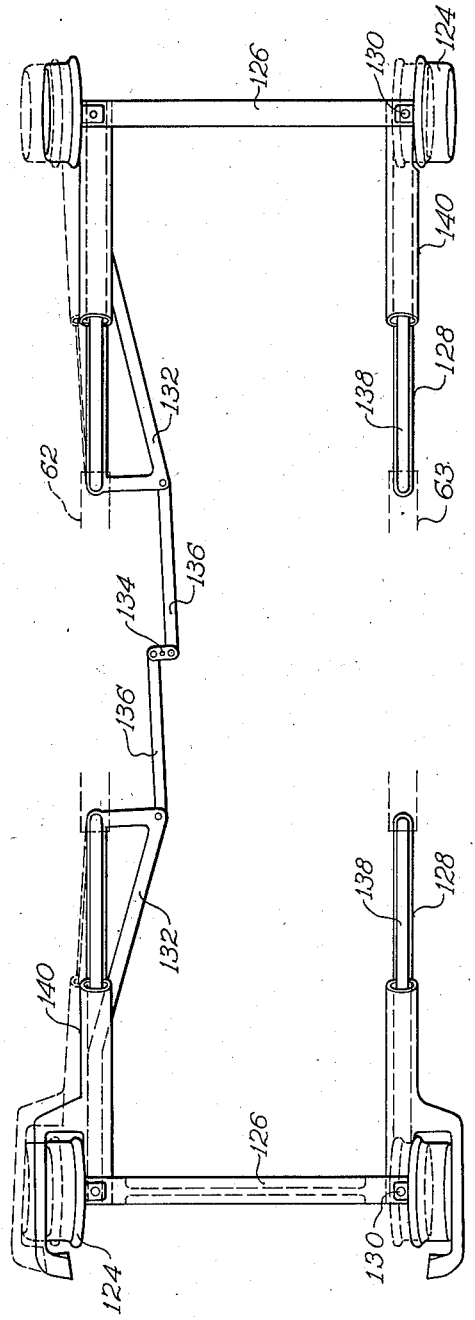

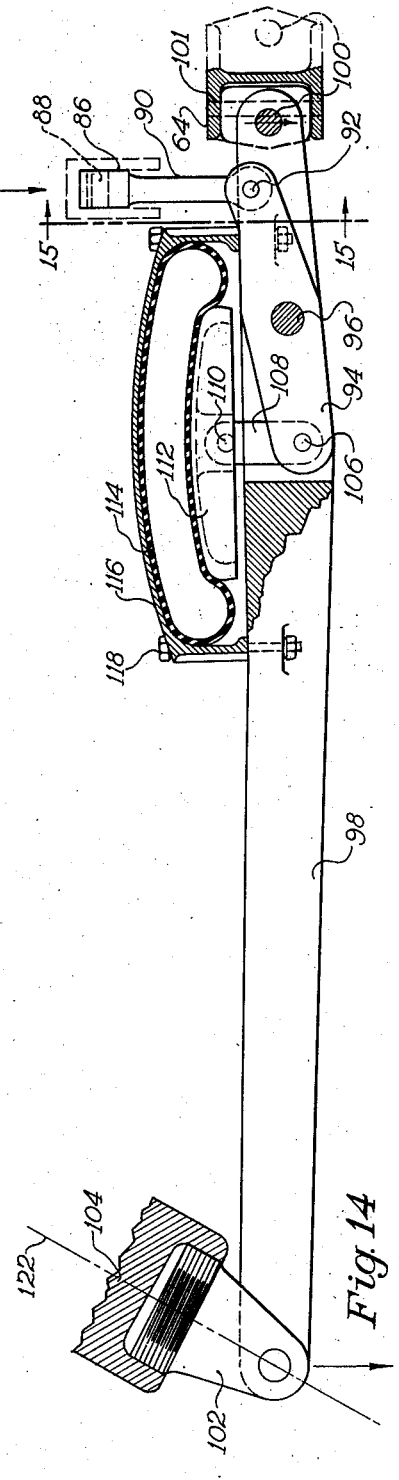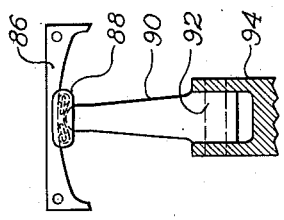

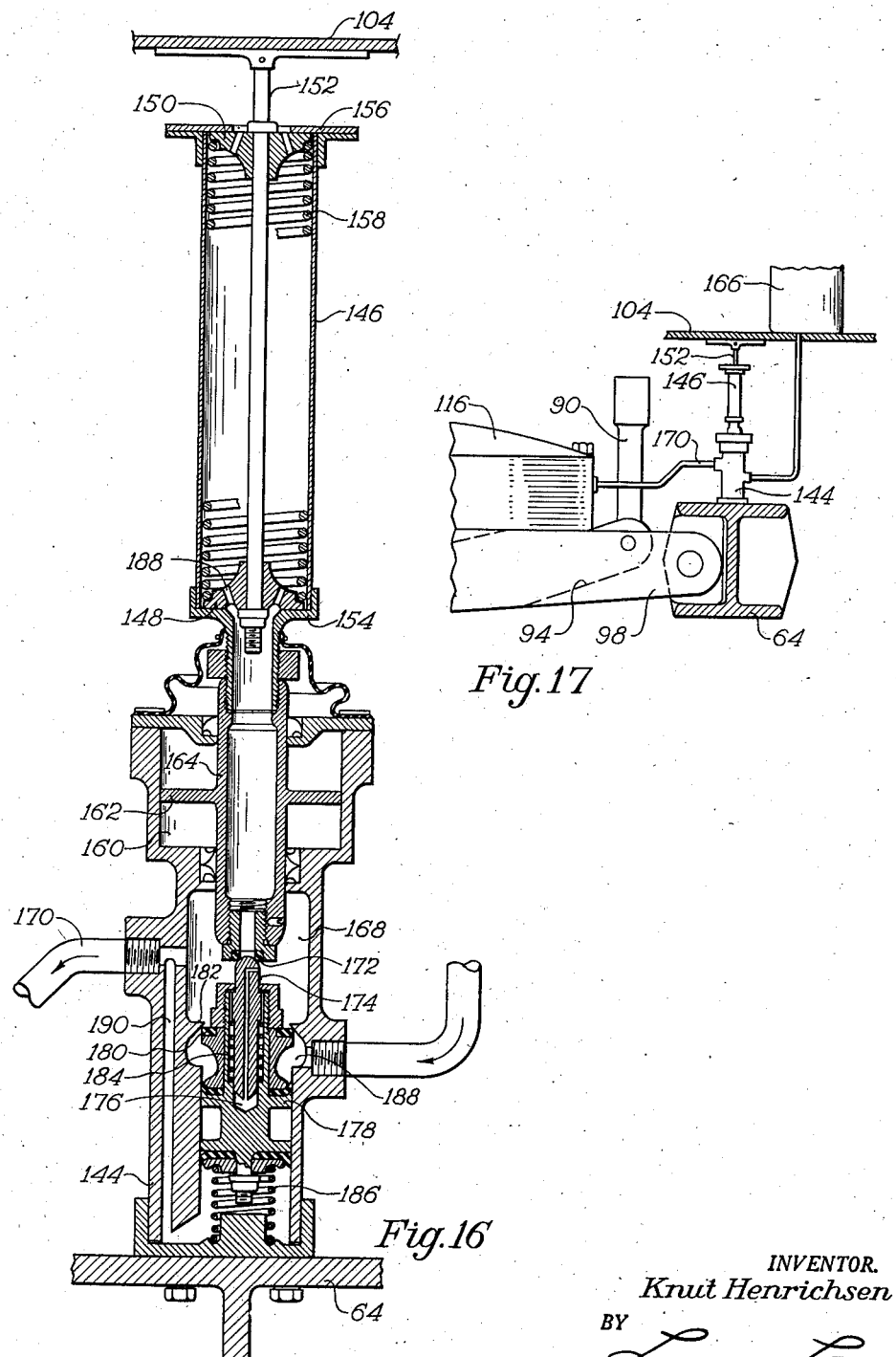

Patented Apr. 25, 1950

2,505,183

UNITED STATES PATENT OFFICE 2,505,183

ARTICULATED VEHICLE

Knut Henrichsen, Los Angeles, Calif., assignor to North American Aviation, Inc.

Application June 3, 1944, Serial No. 538,656

15 Claims. (Cl. 105—200)

This invention relates to articulated vehicles such as railway trains and has as one of its objects to provide an improved streamlined train of minimum height above rail level.

Another object of the invention is to provide an improved articulated vehicle having improved driving means adapted to effect more rapid acceleration, faster top speed, and greater flexibility and smoothness in operation.

Another object of the invention is to provide an articulated vehicle having a simplified wheel truck arrangement permitting a considerable reduction in the number of wheels by which the train is supported.

A further object of the invention is to provide an improved wheel truck for vehicles, whereby a car is mounted for effective pendulum swinging movement (in response to lateral forces) from an axis sufficiently above the center of gravity thereof to provide maximum stability, to cause the car to lean inwardly when rounding a curve, to provide maximum riding comfort, and to be self-centering when lateral forces are withdrawn.

Another object of the invention is to provide an improved shock absorbing mounting for vehicles.

A further object of the invention is to provide an improved drive transmission mechanism for articulated vehicles, adapted to be incorporated in individual wheel trucks and to receive drive from individual power plants located above such trucks so as to effect the general object of providing greater acceleration and speed characteristics as stated above.

Another object of the invention is to provide an improved articulated train having improved seating and entrance and exit facilities.

In the drawings, like reference characters designate similar parts in the several views.

Fig. 1 is a side elevation of a railway train embodying the invention;

Fig. 2 is a plan sectional view of the forward end of the lead car of the train taken in the area indicated by the line 2—2 of Fig. 1;

Fig. 11 is an end view of the same;

Fig. 12 is a transverse sectional view of the same taken generally along the lines 12—12 of Fig. 9;

Fig. 13 is a plan view of the mechanism which controls the lateral deflection of the pilot wheels of the truck in rounding curves;

Fig. 14 is a longitudinal sectional view through the shock absorbing and sway controlling mechanism;

Fig. 15 is a detailed transverse sectional view of a portion of the sway control mechanism taken on the line 15—15 of Fig. 14;

Fig. 16 shows a modification embodying a pressure control mechanism for the pneumatic shock absorber, and Fig. 17 is a detailed sectional view of the pressure control valve unit.

In detail, the railway train illustrated herein as an example of one embodiment of the invention, comprises a lead car A, a series of intermediate cars B, C, and D, and a rear car E. Between each pair of adjacent cars is a drive truck F, each of which embodies an independent power plant and each adapted to support the adjacent end of two cars. Beneath the forward end of the lead car A and the rear end of the rear car E are trucks G which do not embody power plants.

Figure 4:
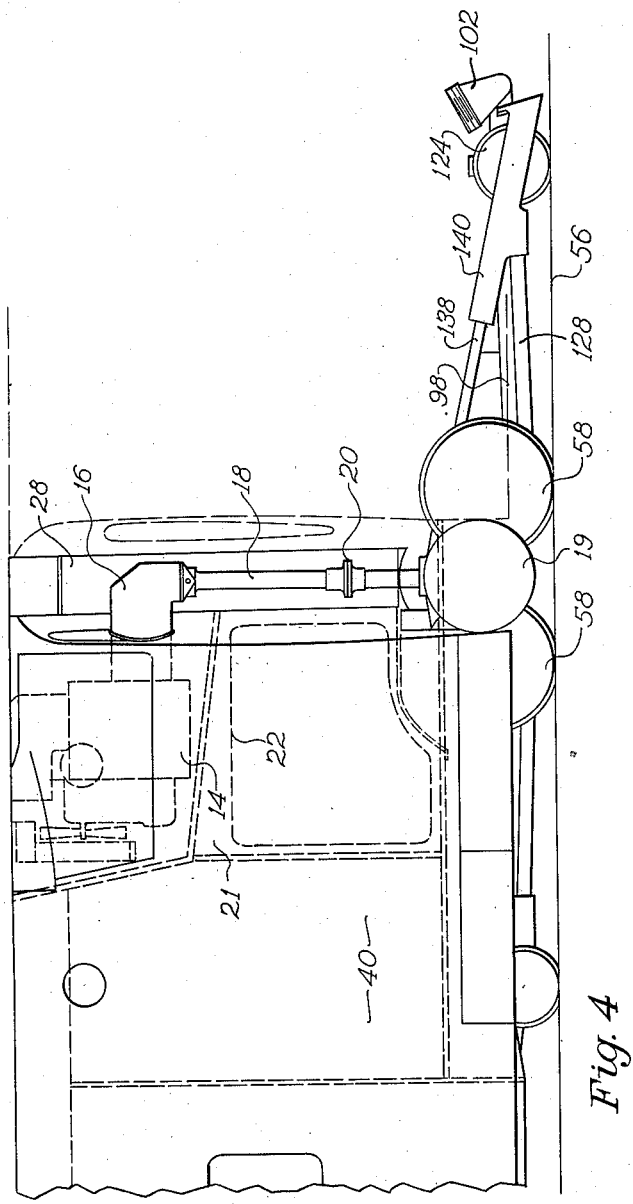
Fig. 4 is a side elevation of adjoining portions of two adjacent cars, illustrating one of the wheel truck units.

The power plant, indicated at 14 in Fig. 4, is located in a compartment in the upper region and in one end of a car B, C, D, or E, and is connected by means of bevel gearing 16 to a drive shaft 18 extending downwardly and connected, through a universal joint 20, to the drive gearing of its respective truck. While different types of power plants may be employed, I prefer to use an internal combustion engine, and to incorporate in the gearing 16 an automatic transmission, torque and speed controlled, adapted, as the train gradually picks up speed from a dead stop, to shift successively from a low gear through several intermediate gears to a high-speed gear. While the throttles of the several power plants will be controlled simultaneously, it is contemplated that the shift from speed to speed will take place independently in the several power plants and not necessarily simultaneously. By thus overlapping the shifts, there will be attained, for the entire train, maximum smoothness and acceleration.

The space 21 below the compartment in which the power plant 14 is located may be utilized for the storage of fuel, a fuel tank being indicated at 22.

Each car is provided with an entry and exit way 26 located centrally between its ends. The adjacent ends are connected by conventional diaphragm type vestibules 28, the drive transmission mechanism being located externally thereof. Each car has the usual windows 30 which, in the lead car A are continued up to the streamlined engineer's cab portion 32, where the two forward windows 34 constitute the windshield or observation windows for the cab 32. Seats 36 are provided for the engineer and the assistant engineer. Rearwardly of the cab 32, the lead car may accommodate a bar 37. The remainder of this car, and of the cars B and D, are each provided with seats 38 for passengers. The car C may constitute a baggage car or a combination baggage car and mail car. The car E is a dining car.

Figure 3:
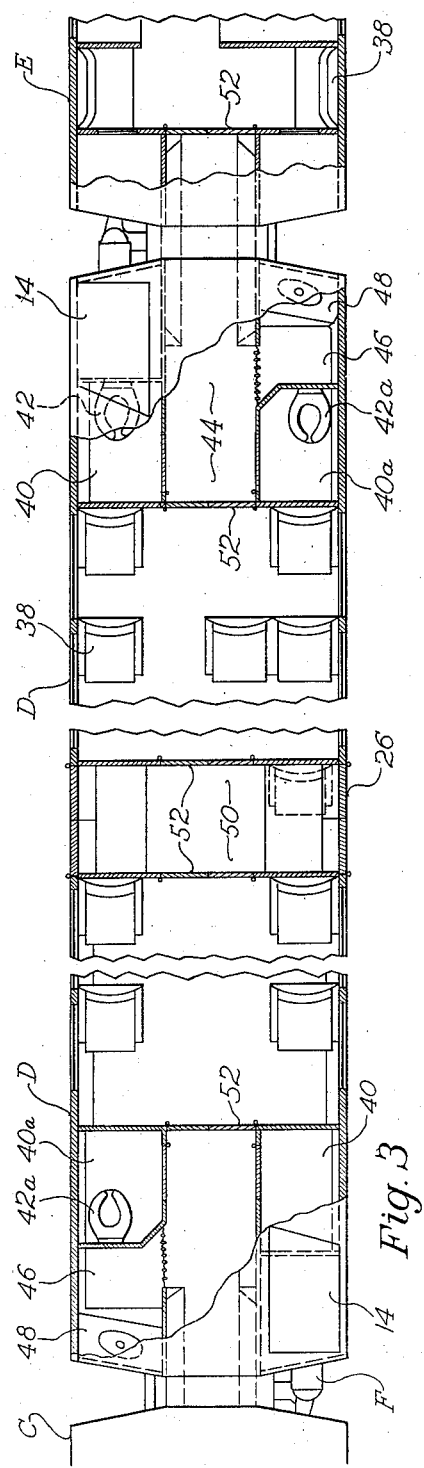
Fig. 3 is a plan sectional view of the central portion of the train showing the major part of one car and portions of adjacent cars taken in the area indicated by the line 3—3 of Fig. 1.

Forwardly of the power plant and fuel compartment 21 is a compartment 40 which may accommodate a commode 42 (see Fig. 3). A similar compartment 40a may be located on the opposite side of the aisle 44 from the compartment 40 and behind the compartment 40a a compartment 46 may accommodate a lavatory 48. The doors 26 open into a central vestibule 50, closed off from the seating compartments of the car by doors 52.

Figure 5:
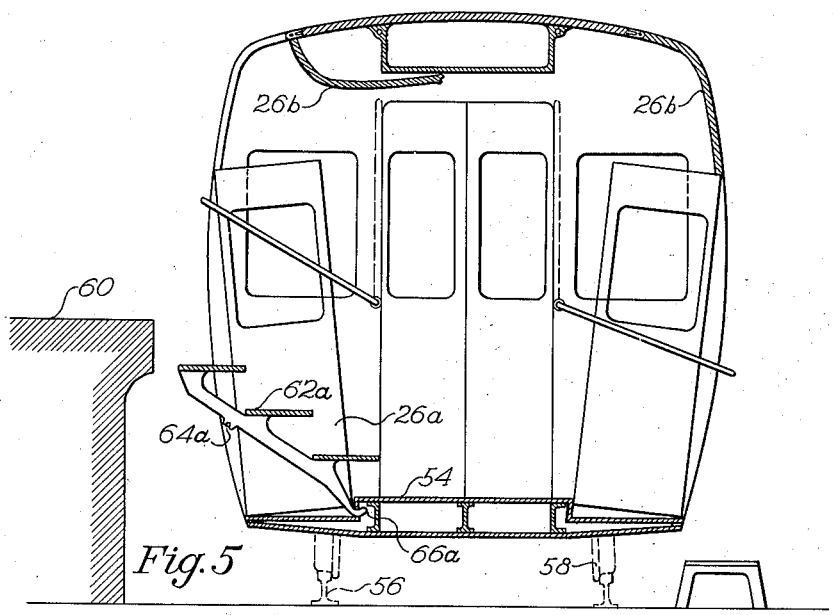
Fig. 5 is a transverse sectional view of the central entrance portion of a car.
Figure 6:
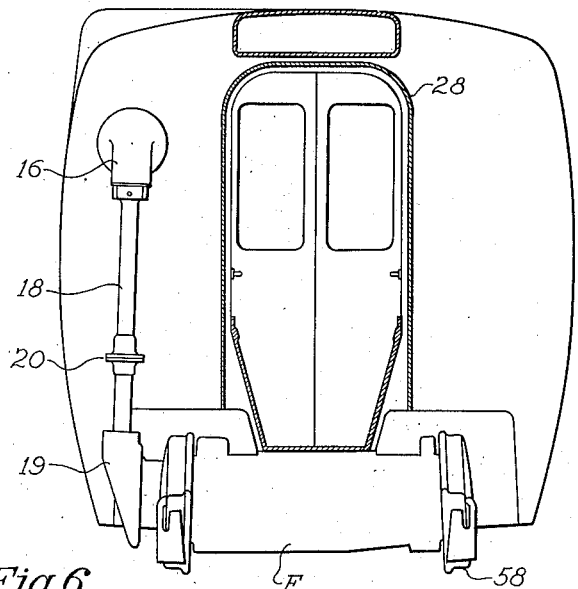
Fig. 6 is an end view of one of the cars and the associated wheel truck thereof.

It may be noted at this point that the end portions of the cars are arranged to accommodate the drive mechanism and the toilet facilities, while entry to the cars is effected intermediate the ends thereof. This makes it possible to drop the floor structure 54 of the cars to a level just above the rails 56 (see Fig. 5). Since there are only two pairs of wheels 58 in each wheel truck, and such wheels are located at the extreme ends of the adjacent cars, the floor may be located considerably below the level of the tops of the wheels, the wheels being accommodated in spaces cut out of such compartments as the fuel compartment 21 (see Fig. 4).

Referring again to Fig. 5, each entry and exit way 26 is closed by a pair of lower door section 26a and an upper door section 26b, the latter being hinged on a horizontal axis on its upper edge for swinging upwardly and the former being hinged conventionally on substantially vertical axes. For entering a car from a high altitude platform 60, I provide a stair device 62a which provides for descent from the platform 60 down to the low level floor 54. Entry from ground level requires no steps. The hinges of the door sections 26b are located in the roof of the car, set back from the sides of the car so as to provide additional head room for passengers descending the stairs 62a. The stairs 62a may be supported by pins 64a mounted in the door frame and by hooking its lower end 66a into the floor sill structure.

Figure 9:
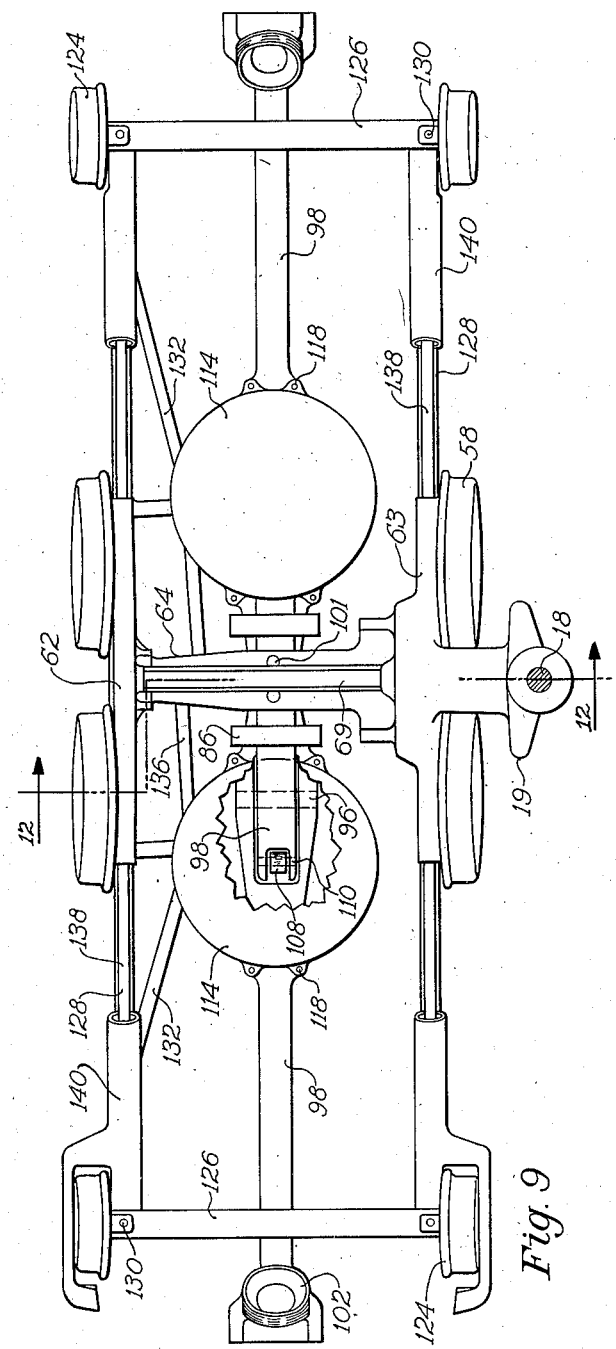
Fig. 9 is a plan view broken away in parts, of a complete wheel truck.
Figure 10:
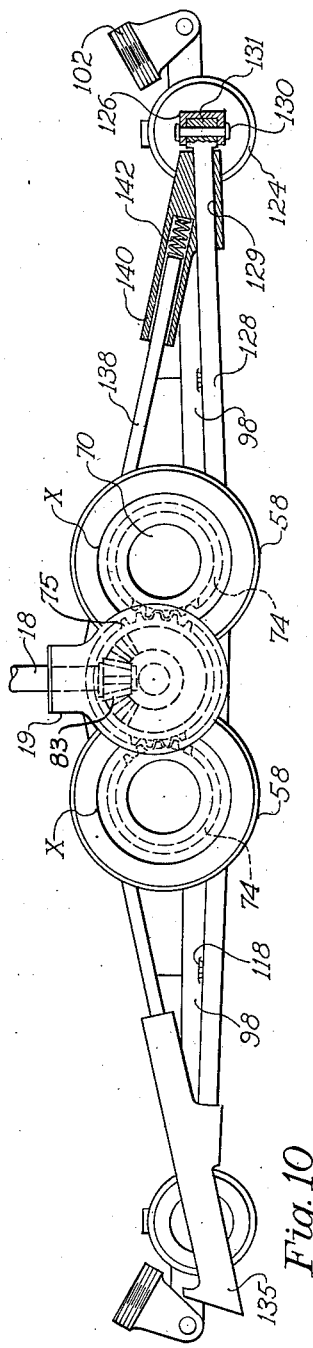
Fig. 10 is a side elevation, partially in section, of the same.

Referring now to Figs. 9, 10 and 12 each wheel truck unit comprises a frame having lateral sills 62 and 63 and a central bolster 64, the bolster 64 being threaded as at 65 into a boss 66 on the sill 62 and the opposite end of the bolster being hinged at 67 between a pair of lugs 68 on the sill 63. The purpose of the threaded connection 65 is to permit torsional displacement of the sills 62 and 63 with reference to each other about the axis of the bolster 64 under twisting loads produced by irregularities in the track, the hinge 67 providing for slight yielding movement of the upper regions of the sills toward or from each other in response to such twisting movement.

A spacer strut 69, socketed at its end in sockets 71 in the sills 62 and 63, carries the transverse load developed between the upper regions of the sills 62 and 63 by the turning moment around the hinge 67 which in turn is caused by the loading of the bolster 64 by the car body as will hereinafter be described. Twisting movements of the sills 62 and 63 about the axis of the bolster 64 will be accompanied by slight universal pivoting movements of the ends of the strut 69 in the sockets 71 and slight hinging about the hinge 67 to accommodate the fore shortening of the effective transverse length of the strut 69 when it is displaced to an angular position from a strictly transverse position.

The sills 62 and 63 are in the form of casings for the wheel drive gears (to be presently described), the wheels 58 being mounted upon stub shafts 70 which are journaled in bearings 72. Within the sills 62 and 63 each shaft 70 carries a pinion 74. On the drive side of the truck the pair of pinions 74 mesh with spur teeth 75 of a crown gear 77, and on the other side of the truck the pair of pinions 74 mesh with a plain spur tooth drive gear 76. A drive shaft 78, extending transversely between the sills 62 and 63, has a universal drive connection 79 at one end with the drive gear 76, and has at its other end a universal drive connection 80 with bevel gear 84a attached thereto. A short drive shaft 82 driven through bevel gear 83 (encased in housing 19) from the vertical drive shaft 18 has suitably attached thereto planet gears 84. These gears drivingly engage gears 77 and 84a, gear 77 driving one side of the truck through spur teeth 75 and gear 84a driving the other side of the truck through universal joint 80, shaft 78, joint 79, and gears 76 and 74.

The load of the car body is applied to the wheel truck through the lever mechanism shown in Fig. 14. Through a cam member 86, the load is applied to a bearing 88 on the upper end of a strut 90 the lower end of which is pivoted at 92 on one end of a short lever 94. The short lever 94 is pivoted at 96 upon a main lever 98 which is fulcrumed at 100 upon the cross beam 64 so as to transmit the down load thereto. The other end of the main lever 98 is pivoted to a fitting 102 which is threaded into a boss 104 fixed to the under side of the car body. The other end of the short lever 94 is pivoted at 106 to a short strut 108 the upper end of which is pivoted at 110 to a pressure pad 112. The reactive load on the short lever 94 is thus transmitted to a yielding pneumatic cushion 114 which is confined within a casing 116 bolted down as at 118 to the lever 98. The mechanism just described constitutes a shock absorber for cushioning shocks transmitted to the lever 98 from the bolster 64. Connection 102 takes the minor component of the downward load applied to the lever 98 at the pivot 96, the major component of the downward load being of course applied to the bolster 64 at the pivot 100. The several components are indicated by arrows.

Figure 8:
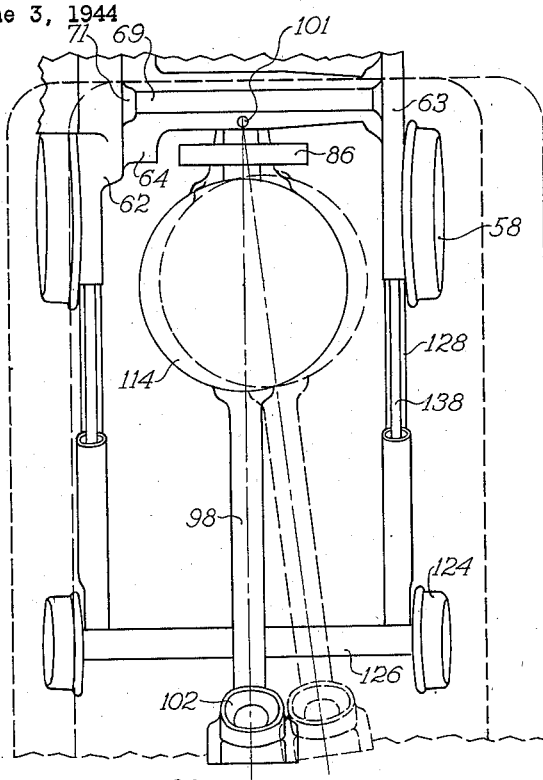
Fig. 8 is a plan view of a portion of one of the trucks with two positions of the car body shown in dotted lines to illustrate the action of the sway control mechanism one position of which is shown in dotted lines.
Figure 7:
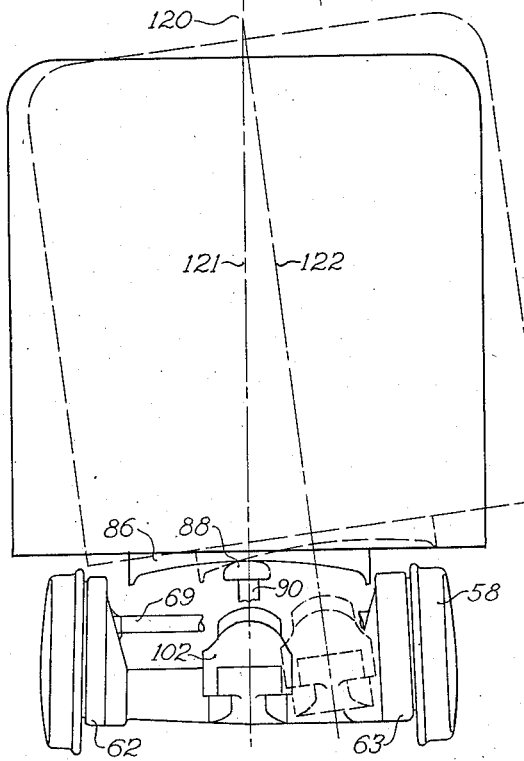
Fig. 7 is an end schematic view of one of the cars, illustrating the sway movement thereof.

The threaded connection 102, being a pivotal one, permits the lever 98 to swing laterally in response to lateral loading of the car body as, for example, under centrifugal forces developed in going around curves (see Fig. 8). The bearing connection between the strut 90 and the cam member 86 in turn permits the car body to shift laterally from its centered position shown in full lines in Fig. 7 to a laterally shifted, raised and tilted position such as that shown in the broken line in Fig. 7. The cam member 86 causes the car body to rise as it shifts laterally, and, conversely, causes the body to return to its centered position when the lateral load is removed. In addition to moving upwardly, the car body will, when it shifts laterally, tilt inwardly toward the center of the curve toward the direction from which the force is applied, so as to maintain the resultant of centrifugal and gravity forces as nearly as possible in the plane of symmetry (the central vertical plane in the centered position) of the car body at all times. Stated somewhat differently, it is aimed to cause the car body to swing, pendulum-like, about an axis indicated at 120, above the center of gravity of the car body. This is effected in the following manner: The axis 122 (Fig. 14) of the fitting 102 is rigidly fixed in the plane of symmetry of the car body by the fitting 104 which is rigidly attached to the car body. In the normal position of the car body shown in full lines in Fig. 7, this plane of symmetry is of course vertical as indicated at 121 and the axis of the fitting 102 will therefore lie in the vertical plane 121. However, in the laterally shifted position of the car body, the lever 98 will be shifted about the vertical axis of the pin 101 of the universal connection between the forward end of the lever 98 and the bolster 64, as indicated in the dotted line position shown in Fig. 8. The lever 98 is substantially unyielding and therefore the axis 122 of the fitting 102 is constrained to remain at all times in a vertical plane intersecting the pin 101. Therefore the point at which the axis 122 intersects the axis of the pin 101 will remain at all times in the plane 121. The lateral shifting of connection 102 from the plane 121 will therefore cause the axis 122 to become inclined with reference to the plane 121 as indicated in Fig. 7, and since the axis 122 continues to lie in the plane of symmetry of the car body, as it swings laterally, the car body will necessarily swing to a position in which its plane of symmetry is inclined to correspond to the inclination of the axis 122 as viewed in end elevation.

Although the lever 98 is sufficiently inflexible to produce the results above described, it is nevertheless flexible to the extent that it will permit the truck to twist about its longitudinal axis with reference to the car body in response to track irregularities without communicating any substantial amount of such movement to the car body. The wheels 58 are cambered outwardly and downwardly as shown in Fig. 12 so as to reduce wear between the flanges and the rails. The universal joints 79 and 80 accommodate this tilting of the wheel axes.

The wheels of the truck are set so closely together that it is considered necessary to provide pilot wheels for facilitating the following of the rails. The pilot wheels are shown at 124 and are mounted on axles 126 which are carried on the enlarged end portions 131 of horizontal rod members 128, the latter being hinged to the axles 126 by vertical pins 130 extending through the end portions 131. The inner ends of the rods 128 are universally pivoted to the sills 62 and 63, so that the pilot wheels may be displaced laterally of the longitudinal planes of the sills 62 and 63 as indicated in dotted lines in Fig. 13. Lateral displacement of both sets of pilot wheels is maintained symmetrical with reference to the drive wheels by linkage including bell crank levers 132 carried by the rods 128 on one side of the truck, a rocking lever 134 pivoted on the bolster 64, and links 136 connecting the respective ends of the lever 134 to the bell crank levers 132. The pilot wheels are yieldingly pressed downwardly against the rails by struts 138 (Fig. 15) pivoted to the sills 62 and 63, telescoping in cylinders 140, which in turn are slidably mounted upon the arms 128 and acted upon by coil springs 142 within the cylinders 140.

On the forward end of each truck, the cylinders 140 are extended around the pilot wheels 124 to provide fenders 135.

Referring now to Figs. 16 and 17, which show a modification of the cushion mechanism, I provide means for varying the pressure of the air cushion in accordance with the loading of the car, so as to maintain the level of the car substantially the same at all times irrespective of loading. Such mechanism comprises a valve casing 144 which is attached to some portion of the truck frame, and which carries at its upper end a cylinder 146. In the cylinder 146 are a pair of pistons 148 and 150 through which is slidably extended a piston rod 152 the upper end of which is attached to the car body. The pistons 148 and 150 are urged apart and normally into engagement with the ends 154 and 156 of the cylinder, by means of a coil spring 158, which is under compression. Between the cylinder 146 and the valve casing 144 is a dash pot 160 filled with a body of fluid in which operates a dash piston 162 having a tubular hub portion 164. The cylinder 146 is mounted on the upper end of the hub 164. The dash pot offers sufficient resistance to movement of the cylinder 146 so that rapid vibration of the car body relative to the wheel truck will be absorbed by compression and extension of the coil spring 158. Slow, steady pressure exerted against the cylinder 146 through the spring 158 will, however, cause the dash piston 162 to slowly creep toward the lower end of the dash pot 160. This movement serves to operate a valve mechanism in the casing 144 to direct air from an air storage reservoir 166 through a valve chamber 168 to a tube 170 leading to the air spring. The mechanism for effecting this is as follows: On the lower end of the hub 164 is a valve seat 172 which engages a valve stem 174 slidably mounted in a valve bore 176 in a piston 178. The piston 178 carries a valve gasket 180 which seats against a valve seat 182 in the casing 144 defining the lower extremity of the chamber 168. Downward movement of the hub 164 pushes the valve element 174 downwardly in the bore 176, compressing a spring 184, until the lower end of the element 174 contacts the lower end of the bore 176, whereupon further downward movement is transmitted to the piston 178 which moves downwardly against the compression of a spring 186, thus unseating the valve 180 and permitting air from the reservoir 166 to enter the annular chamber 168 below the valve seat 182 and then pass through the chamber 168 to the air cushion. The pressure on the cushion will then increase, raising the car body and causing the valve piston 178 to recede, shutting off the air from the reservoir 166 and restoring the car body to its proper level.

When the loading of the car body is decreased, the pressure in the air cushion will cause it to rise, resulting in upward movement of the dash pot hub 164 and unseating the valve seat 172 from the valve element 174. The air will then be permitted to escape from the air cushion through the hub 164 and then through openings 188 in the pistons 148 and 150 and thence to atmosphere, thus reducing the pressure in the air spring and permitting the car body to sink down to its normal level. This will cause the valve 172 to recede, shutting off the escape of air from the air cushion.

Air pressure against the valve gasket 180 is balanced by the same pressure against the lower end of the piston 178, communicated through a passageway 190. Consequently, the downward movement of the dash piston 162 is opposed only by the spring 186, which has a slightly lower load value than the spring 158 so as to be dominated by the latter.

The foregoing may be taken as illustrative of one form in which the invention may be embodied, it being my intention to cover in my claims the use of any equivalent arrangement or apparatus.

I claim as my invention:

1. A wheel truck for a light-weight railway train comprising a pair of sills, a bolster connected at one end to one of said sills with freedom for relative rotative movement about its longitudinal axis and hingedly connected to the other sill for movement about a horizontal axis transverse to such longitudinal axis, whereby to permit twisting movement of one sill relative to the other around said longitudinal axis, means for supporting a car body comprising a connection between said bolster and said body, and wheels journalled upon and supporting said sills.

2. Shock absorbing means for vehicles comprising a wheel supported member, a main lever pivoted at one end to said member and linked at its other end to the under side of the car body to be supported, an air cushion, means confining said air cushion from above, said confining means being tied down to said lever, a plunger engaging the under side of said air cushion, and linkage including a short lever pivoted on said main lever, adapted to transfer the downward load applied to said linkage from the car body to upward pressure against said plunger.

3. Supporting means for a vehicle body comprising a wheel supported member, a lever having a universally pivotal connection at one end with said member and having at its other end a pivotal connection with the under side of the vehicle body on a horizontal axis and an axis inclined upwardly and intersecting the upwardly extended vertical axis of said universally pivoted connection, and means connecting an intermediate region of the lever to the body for transferring the load of the body to the lever and adapted to permit the body to sway laterally and to constrain it to move in an arc curving upwardly from a centered position, said lever, through its respective connections with the member and the body, and because of the inclination of its connection with the body, constraining the body to tilt so as to convert said laterally swaying movement into swinging movement about an axis above the center of gravity of the body.

4. Supporting means for a vehicle body comprising a wheel supported member, a lever having a universally pivotal connection at one end with said member and having at its other end a pivotal connection with said body on a horizontal axis and an axis inclined upwardly and intersecting the upward extension of the axis of said universal pivotal connection, and means for transferring the load of the body to an intermediate region of the lever and adapted to permit the car body to sway laterally, said lever through its respective connections with said member and the body and because of the inclination of its connection with the body, constraining the body to tilt so that its upper region leans away from the direction of sway of its lower region from a centered position.

5. A wheel truck for a light-weight railway train comprising a pair of sills, a bolster having a connection with one of said sills permitting rotatable adjustment thereof around its longitudinal axis with reference to one sill, and having a hinged connection to the other sill on a horizontal axis transverse to its longitudinal axis, whereby to permit twisting movement of one sill relative to the other around said longitudinal axis, means for supporting a car body comprising a connection between said bolster and said body, and wheels journalled upon and supporting said sills, said bolster being located below the level of the axes of said wheels and including a truss member having a universal connection at its respective ends with the respective sills above the level of said wheel axes.

6. A wheel truck for a light-weight railway train comprising a pair of sills, a bolster having a connection with one of said sills permitting rotatable adjustment thereof around its longitudinal axis with reference to one sill, and having a hinged connection to the other sill on a horizontal axis transverse to its longitudinal axis, whereby to permit twisting movement of one sill relative to the other around said longitudinal axis, means for supporting a car body comprising a connection between said bolster and said body, and wheels journalled upon and supporting said sills, said sills being in the form of wheel casings and including gearing in said casings, each set of gearings including a gear for each wheel and a drive gear located between and enmeshed with the wheel gears, and a drive shaft extending between said sills and having universal connections with the respective drive gears.

7. A shock absorbing means for vehicles comprising a wheel supported member, a main lever pivoted at one end to said member and linked at its other end to the under side of the car body to be supported, an air cushion, means confining said air cushion from above, said confining means being tied down to said lever, a plunger engaging the under side of said air cushion, and linkage including a short lever pivoted upon said main lever, adapted to transfer the downward load applied to said linkage from the car body to upward pressure against said plunger, a strut member at the end of said main lever and extending upwardly, and a cam track attached to the lower side of the car body and having bearing engagement against the upper end of said strut member, and the said cam track being shaped to sway laterally with reference to the supporting means and to cause it to rise in both directions of sway from a centered position.

8. Supporting means for a vehicle body comprising a wheel supported member, a lever having a universal pivotal connection at one end with said member and having at its other end a pivotal connection with said body on a horizontal axis and an axis inclined upwardly and intersecting the upward extension of the axis of said universal pivotal connection, and means for transferring the load of the body to an intermediate region of the lever and adapted to permit the car body to sway laterally, said lever through its respective connections with said member and the body and because of the inclination of its connection with the body, constraining the body to tilt so that its upper region leans away from the direction of sway of its lower region from a centered position, said means comprising an arcuate cam carried by said body and a bearing element carried by said member and engaging said cam.

9. Supporting means for a vehicle body comprising a wheel supported member, a lever having a universal pivotal connection at one end with said member and having at its other end a pivotal connection with said body on a horizontal axis and an axis inclined upwardly and intersecting the upward extension of the axis of said universal pivotal connection, and means for transferring the load of the body to an intermediate region of the lever and adapted to permit the car body to sway laterally, said lever through its respective connections with said member and the body and because of the inclination of its connection with the body, constraining the body to tilt so that its upper region leans away from the direction of sway of its lower region from a centered position, said body having an arcuate concave cam track attached to the bottom thereof and said wheel supported member including a bearing element supporting said cam track from below, said cam track being adapted to center the body with relation to the wheel supported member as a result of its engagement with said bearing element, and being adapted, when the body swings laterally, to cause the body to simultaneously move upwardly.

10. An arrangement for mounting each end of a car body on a wheel truck comprising a lever connected at one end to said wheel truck for movement about a horizontal and a vertical axis, and at the other end to said car body with freedom for movement about a horizontal axis and an axis which is inclined to intersect said vertical axis, and means for transferring a portion of the load of the car to an intermediate portion of said lever.

11. A device as recited in claim 10 and further including means operatively associated with said car body and said lever and responsive to loading of said body to absorb shock and maintain said body at a substantially uniform level.

12. A device as recited in claim 10 in which said last named means includes a sliding connection permitting lateral movement of said car body.

13. A device as recited in claim 10 in which said last named means includes a cam member which causes the car body to tilt upon being shifted laterally.

14. A device as recited in claim 10 in which said last named means includes a cam member which causes said car body to tilt upon shifting laterally and further includes means operatively associated with said car body and said lever and responsive to loading of said body to absorb shock and maintain said body at a substantially uniform level.

15. A device as recited in claim 10 in which said last named means includes an additional lever pivotally connected to said first named lever, cam means operatively connecting said car body to one end of said additional lever for sliding and tilting movement of the car body, and an air cushion carried by said first named lever and operatively connected to the other end of said additional lever for absorbing shock.

KNUT HENRICHSEN.

REFERENCES CITED

The following references are of record in the file of this patent:

UNITED STATES PATENTS

| Number | Name | Date |
| --- | --- | --- |
| 495,338 | Hunt | Apr. 11, 1893 |
| 897,270 | Chapin | Sept. 1, 1908 |
| 1,412,075 | Way | Apr. 11, 1922 |
| 2,011,918 | Stedefeld et al. | Aug. 20, 1935 |
| 2,141,592 | Clar et al. | Dec. 27, 1938 |
| 2,205,506 | Van der Sluys | June 25, 1940 |
| 2,225,242 | Van Dorn et al. | Dec. 17, 1940 |
| 2,342,724 | Candee | Feb. 29, 1944 |
| 2,361,575 | Thompson | Oct. 31, 1944 |

FOREIGN PATENTS

| Number | Country | Date |
| --- | --- | --- |
| 85,105 | Sweden | Dec. 24, 1935 |